(12) United States Patent
Kubota et al.

(10) Patent No.: US 11,932,075 B2
(45) Date of Patent: Mar. 19, 2024

(54) SUSPENSION DEVICE (71) Applicant: HONDA MOTOR CO., LTD., Tokyo (JP)

(72) Inventors: Kohei Kubota, Tokyo (JP); Takehito Masubuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 17/675,298

(22) Filed: Feb. 18, 2022

(65) Prior Publication Data

US 2022/0314726 A1 Oct. 6, 2022

(30) Foreign Application Priority Data

Mar. 30, 2021 (JP) .................................. 2021-057361

(51) Int. Cl.
| | |
|---|---|
| B60G 17/02 | (2006.01) |
| B60G 13/08 | (2006.01) |
| B60G 15/06 | (2006.01) |
| B60G 17/015 | (2006.01) |
| B60G 17/06 | (2006.01) |
| F16F 9/32 | (2006.01) |

(52) U.S. Cl.
CPC ........... *B60G 17/021* (2013.01); *B60G 13/08* (2013.01); *B60G 15/065* (2013.01); *B60G 17/0157* (2013.01); *B60G 2202/312* (2013.01); *B60G 2202/32* (2013.01); *B60G 2202/42* (2013.01); *F16F 9/3242* (2013.01)

(58) Field of Classification Search
CPC ...... B60G 17/08; B60G 13/08; B60G 17/021; B60G 15/065; B60G 17/0157; B60G 2202/312; B60G 2202/32; B60G 2202/42; B60G 2204/418; B60G 2206/41; B60G 15/067; B60G 13/16; F16F 15/03; F16F 15/022; F16F 2232/06; F16F 9/3207; F16F 2025/2436; F16C 25/083; F16C 2326/05; F16C 19/06
See application file for complete search history.

(56) References Cited

U.S. PATENT DOCUMENTS

| | | | | |
|---|---|---|---|---|
| 1,797,929 A | * | 3/1931 | Rouanet | ................... B60G 7/00 267/216 |
| 3,154,954 A | * | 11/1964 | Geyer | ..................... F16H 25/04 33/1 H |
| 3,422,696 A | * | 1/1969 | Valenti | ................ F16H 25/2204 74/89.35 |

(Continued)

FOREIGN PATENT DOCUMENTS

JP         2016-17535         2/2016

*Primary Examiner* — Robert A. Siconolfi
*Assistant Examiner* — James K Hsiao
(74) *Attorney, Agent, or Firm* — Rankin, Hill & Clark LLP (57) ABSTRACT

A suspension device includes a damper. The damper includes: an outer cylinder; a ball screw housed in the outer cylinder; a fastening member that supports the ball screw inserted therethrough and is attached to an end part of the outer cylinder; and a fixing member that is attached to an end part of the ball screw and fixes the ball screw to the fastening member. An insertion portion, where the ball screw is inserted into the fastening member, is provided with a fitting portion where the ball screw fits the fastening member, and the fitting portion has a spline fitting structure.

4 Claims, 9 Drawing Sheets

(56) References Cited

U.S. PATENT DOCUMENTS

| | | | | |
|---|---|---|---|---|
| 4,905,533 | A * | 3/1990 | Benton | F16H 25/2418 |
| | | | | 277/354 |
| 5,083,626 | A * | 1/1992 | Abe | F16C 35/061 |
| | | | | 180/445 |
| 5,865,272 | A * | 2/1999 | Wiggins | F16K 31/047 |
| | | | | 74/89.31 |
| 6,389,915 | B1 * | 5/2002 | Wngett | B64C 13/00 |
| | | | | 74/424.71 |
| 9,279,487 | B1 * | 3/2016 | Guglietti | F16H 25/2418 |
| 9,464,643 | B2 * | 10/2016 | Shu | F16H 25/20 |
| 10,837,532 | B2 * | 11/2020 | Kwaśniewski | F16H 25/2204 |
| 2003/0175068 | A1 * | 9/2003 | Abels | F16J 3/042 |
| | | | | 403/133 |
| 2004/0016312 | A1 * | 1/2004 | Yabe | F16C 29/06 |
| | | | | 74/89.4 |
| 2006/0163863 | A1 * | 7/2006 | Ellmann | B60G 15/068 |
| | | | | 280/124.179 |
| 2009/0057969 | A1 * | 3/2009 | Michel | B60G 15/065 |
| | | | | 267/218 |
| 2009/0121398 | A1 * | 5/2009 | Inoue | B60G 17/0157 |
| | | | | 267/140.14 |
| 2012/0079902 | A1 * | 4/2012 | Osterlanger | F16D 65/18 |
| | | | | 74/89.23 |
| 2012/0085186 | A1 * | 4/2012 | Osterlanger | F16D 65/18 |
| | | | | 74/89.37 |
| 2012/0132019 | A1 * | 5/2012 | Osterlaenger | B60G 7/006 |
| | | | | 74/89.23 |
| 2012/0181767 | A1 * | 7/2012 | Kondo | B60G 17/02 |
| | | | | 280/124.16 |
| 2012/0187640 | A1 * | 7/2012 | Kondo | B60G 13/14 |
| | | | | 280/5.514 |
| 2014/0260727 | A1 * | 9/2014 | Webber | B62D 5/0448 |
| | | | | 74/89.23 |
| 2014/0353067 | A1 * | 12/2014 | Fujii | B60G 7/006 |
| | | | | 180/444 |
| 2014/0353071 | A1 * | 12/2014 | Ando | B62D 15/0225 |
| | | | | 180/445 |
| 2015/0285348 | A1 * | 10/2015 | Ikeda | H02K 7/06 |
| | | | | 74/89.36 |
| 2017/0114580 | A1 * | 4/2017 | Dietzel | E05F 1/105 |
| 2018/0087634 | A1 * | 3/2018 | Muster | B64C 25/24 |
| 2018/0208010 | A1 * | 7/2018 | Wuebbolt-Gorbatenko | |
| | | | | F16H 25/2228 |
| 2019/0101195 | A1 * | 4/2019 | Kwasniewski | F16H 25/2204 |
| 2019/0107127 | A1 * | 4/2019 | Raymond | F15B 15/02 |
| 2019/0127016 | A1 * | 5/2019 | Murakami | F16F 9/46 |
| 2019/0168800 | A1 * | 6/2019 | Urbach | F16H 25/24 |
| 2019/0248203 | A1 * | 8/2019 | Krehmer | B60G 17/0157 |
| 2019/0263211 | A1 * | 8/2019 | Rosenfeld | B60G 17/021 |
| 2020/0018259 | A1 * | 1/2020 | Werquin | F02K 1/766 |
| 2023/0287941 | A1 * | 9/2023 | Dellon | B25J 9/1025 |
| | | | | 464/46 |
| 2023/0294476 | A1 * | 9/2023 | Birch | B60G 17/08 |
| | | | | 280/5.515 |
| 2023/0296164 | A1 * | 9/2023 | Yamasaki | F16H 25/2204 |
| | | | | 74/89.23 |

* cited by examiner

SUSPENSION DEVICE

INCORPORATION BY REFERENCE

The present application claims priority under 35 U.S.C. § 119 to Japanese Patent Application No. 2021-057361 filed on Mar. 30, 2021. The content of the application is incorporated herein by reference in its entirety.

BACKGROUND OF THE INVENTION

Field of the Invention

The present invention relates to a suspension device.

Description of the Related Art

Suspension devices are applied to vehicles, for example, to damp vibration and impact applied to the vehicle and improve ride quality. In recent years, as a suspension device of this type, a suspension device including a nut screwed with a screw shaft portion and generating damping force by the electromagnetic action of a motor has been developed (see, for example, Japanese Patent Laid-Open No. 2016-17535). In the suspension device disclosed in Japanese Patent Laid-Open No. 2016-17535, when a nut receives a load from the outside and the nut moves straight, the screw shaft portion rotates. When the screw shaft portion transmits the rotation to a motor, the motor generates rotational torque that suppresses rotational movement. This suppresses the straight movement of the nut and damp the load applied to the suspension device.

Meanwhile, among suspension devices including a screw shaft portion (hereinafter referred to as a ball screw) and a nut screwed with the ball screw, some have a fixing member tightened to the end part of the ball screw to fix the ball screw to the inside of the cylinder portion. In that case, a problem arises such that: the torque based on the rotation of the ball screw is transmitted to the fixing member to loosen the fixing of the fixing member; and this deviates the axis of the ball screw, and this axis deviation applies a load.

The present invention has been made in view of the above circumstances, and an object of the present invention is to provide a suspension device that suppresses a load due to deviation of a ball screw axis.

SUMMARY OF THE INVENTION

In order to achieve the above object, an aspect of the present invention is a suspension device including a damper, the damper including a cylinder portion, a ball screw housed in the cylinder portion, a fastening member that supports the ball screw with the ball screw being inserted through the fastening member and is attached to an end part of the cylinder portion, and a fixing member that is attached to an end part of the ball screw and fixes the ball screw to the fastening member, wherein an insertion portion, where the ball screw is inserted into the fastening member, is provided with a fitting portion where the ball screw fits the fastening member, the fitting portion having a spline fitting structure.

An aspect of the present invention can suppress the problem in which the torque due to the rotation of the ball screw is transmitted to the fixing member to loosen the fixing of the fixing member so that the axis of the ball screw deviates. Therefore, this can suppress the load applied due to the axis deviation of the ball screw.

BRIEF DESCRIPTION OF THE DRAWINGS

FIGS. 6A and 6B are diagrams for describing rigidity of a support portion of the nut assembly.

FIGS. 9A and 9B are diagrams for describing a torque transmission path.

DETAILED DESCRIPTION OF THE PREFERRED EMBODIMENTS

The following describes a suspension device according to the present invention in detail with suitable embodiments with reference to the attached drawings.

Figure 1:
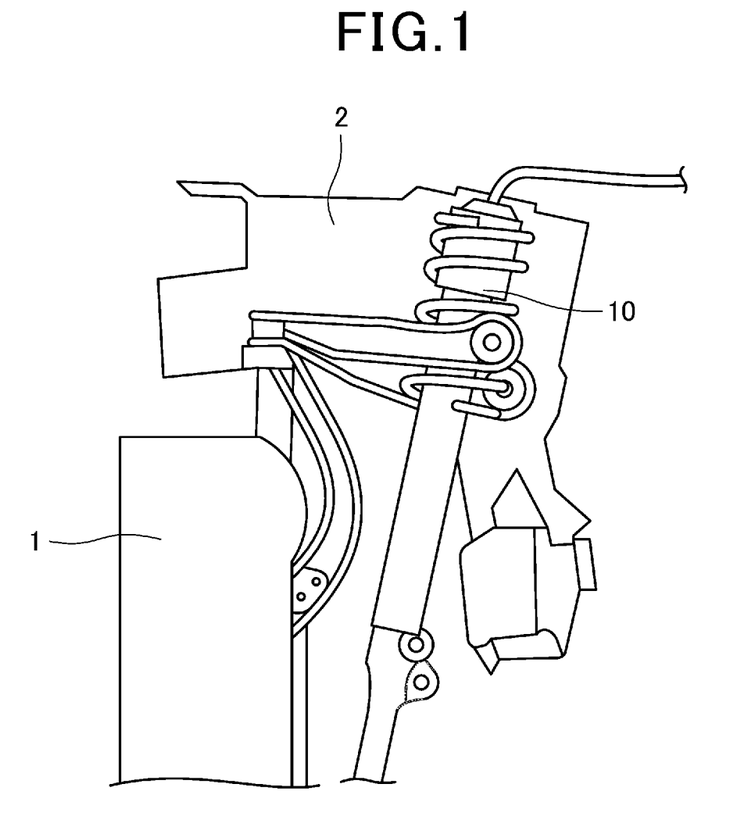
FIG. 1 is a diagram showing an example of mounting a suspension device according to an embodiment of the present invention on a vehicle.

FIG. 1 is a diagram showing an example of mounting the suspension device 10 according to this embodiment on a vehicle. The suspension device 10 is configured as an external force mitigation device of a vehicle. The suspension device 10 is provided between a vehicle body 2 and wheels 1 to mitigate external force including vibration and impact from unevenness of the road surface, and improves ride quality, steering stability, etc. by pressing the wheel 1 against the road surface. Note that where to install the suspension device 10 is not limited to a vehicle, and the suspension device 10 can be applied to any part as a vibration damping device for suppressing vibration, for example.

Figure 2:
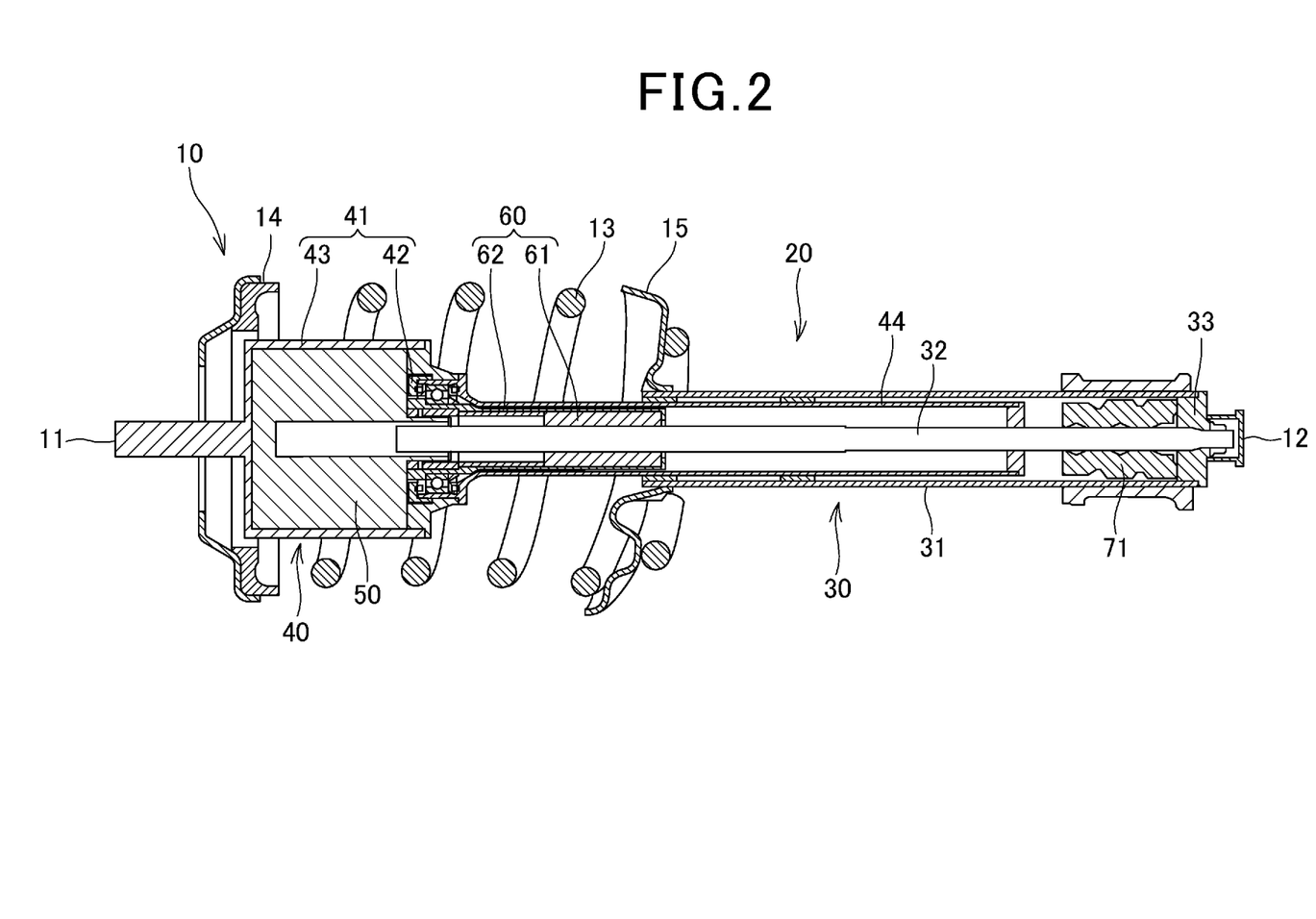
FIG. 2 is a schematic cross-sectional view in an axial direction showing an overall image of the suspension device.

FIG. 2 is a schematic cross-sectional view in an axial direction of the suspension device 10. The suspension device 10 has a structure that electromagnetically generates a damping force. The suspension device 10 has one end portion 11 (vehicle body side end portion) mounted on a suspension part of the vehicle body 2 (for example, a vehicle body frame or a suspension portion of the body), and the other end portion 12 (wheel side end portion) mounted on a drive transmission unit (for example, a driven gear or a shaft) for transmitting rotational driving force to the wheel 1.

The suspension device 10 includes a spring 13 and a damper (shock absorber) 20. The damper 20 is formed in a long cylindrical shape, and includes a housing unit 40 and a cylinder unit 30.

The suspension device 10 includes a first spring support portion 14, a second spring support portion 15, and a spring 13 arranged between the first spring support portion 14 and the second spring support portion 15. The first spring support portion 14 is provided on the housing unit 40 side, and the second spring support portion 15 is provided on the cylinder unit 30 side.

With the extension and contraction of the spring 13, the cylinder unit 30 is relatively movable with respect to the housing unit 40. The damper 20 extends and contracts with the relative movement between the housing unit 40 and the cylinder unit 30.

The cylinder unit 30 includes an outer cylinder 31, a ball screw 32, and a fastening member 33. The outer cylinder 31 is formed in a cylindrical shape with a rod-shaped ball screw 32 arranged inside. The fitting of the ball screw 32 and the fastening member 33 is to be described below.

The housing unit 40 includes a housing 41, a motor 50, and a nut assembly 60 (nut unit). The housing 41 includes a first housing 42 formed so as to accommodate a part of the nut assembly 60 inside, and a second housing 43 formed so as to accommodate the motor 50 inside. The first housing 42 and the second housing 43 are connected by means such as screw tightening. The wheel side (tire side) part of the first housing 42 is an inner cylinder 44 formed to have a smaller diameter than the outer cylinder 31, and a part of the inner cylinder 44 is housed inside the outer cylinder 31. The housing 41 and the outer cylinder 31 are made of metal.

The nut assembly 60 is pivotally supported inside the first housing 42 in a rotatable manner. The nut assembly 60 includes a ball screw nut 61 and a nut support portion 62. The nut support portion 62 has a long cylindrical shape in the axial direction, and a ball screw nut 61 is provided on the inner peripheral surface of the wheel side portion. The ball screw nut 61 has a hole penetrating in the axial direction, and is a hollow member through which the ball screw 32 is inserted. The ball screw nut 61 and the ball screw 32 are screwed together.

The ball screw nut 61 (nut assembly 60) rotates around the shaft as the ball screw 32, fixed to the outer cylinder 31, moves in the axial direction. The rotation of the nut assembly 60 is transmitted to the motor 50 to generate an induced electromotive force in the motor 50. The motor 50 has a control unit (not shown) connected thereto, and the control unit generates a rotational torque for rotating the motor 50 in the opposite direction based on the induced electromotive force. The control unit generates a rotational torque proportional to the induced electromotive force. The nut assembly 60 receives this rotational torque from the motor 50 to rotate in the opposite direction. This damps the movement (straight movement) of the ball screw 32 in the axial direction to reduce the vibration (up-down movement) of the suspension device 10 as a whole.

The inner peripheral surface of the ball screw nut 61 is provided with a ball holding member (not shown). The ball holding member is formed in a cylindrical shape, and the inner diameter of the ball holding member is substantially the same as the outer diameter of the ball screw 32. The inner peripheral surface of the ball holding member has a plurality of balls (rolling bodies) held thereon so that they can roll and cannot fall off. The balls slightly separate the ball screw nut 61 and the ball screw 32, and displace the ball screw nut 61 with respect to the ball screw 32.

The outer peripheral surface of the ball screw 32 is provided with a screw groove (not shown) spirally. The screw groove is formed, for example, in an arc shape in cross section, and has a relatively wide groove width. The plurality of balls held by the ball screw nut 61 fit in the screw groove of the ball screw 32. As the plurality of balls roll diagonally along the screw groove, the ball screw nut 61 rotates relative to the ball screw 32. The nut assembly 60 rotates around the shaft by the transmitted rotational torque of the motor 50, and thereby generates a damping force for suppressing the straight movement of the ball screw 32.

The motor 50 is housed in the second housing 43. For the motor 50, a hollow motor is used. The rotational torque of the motor 50 is transmitted to the nut assembly 60.

Figure 3:
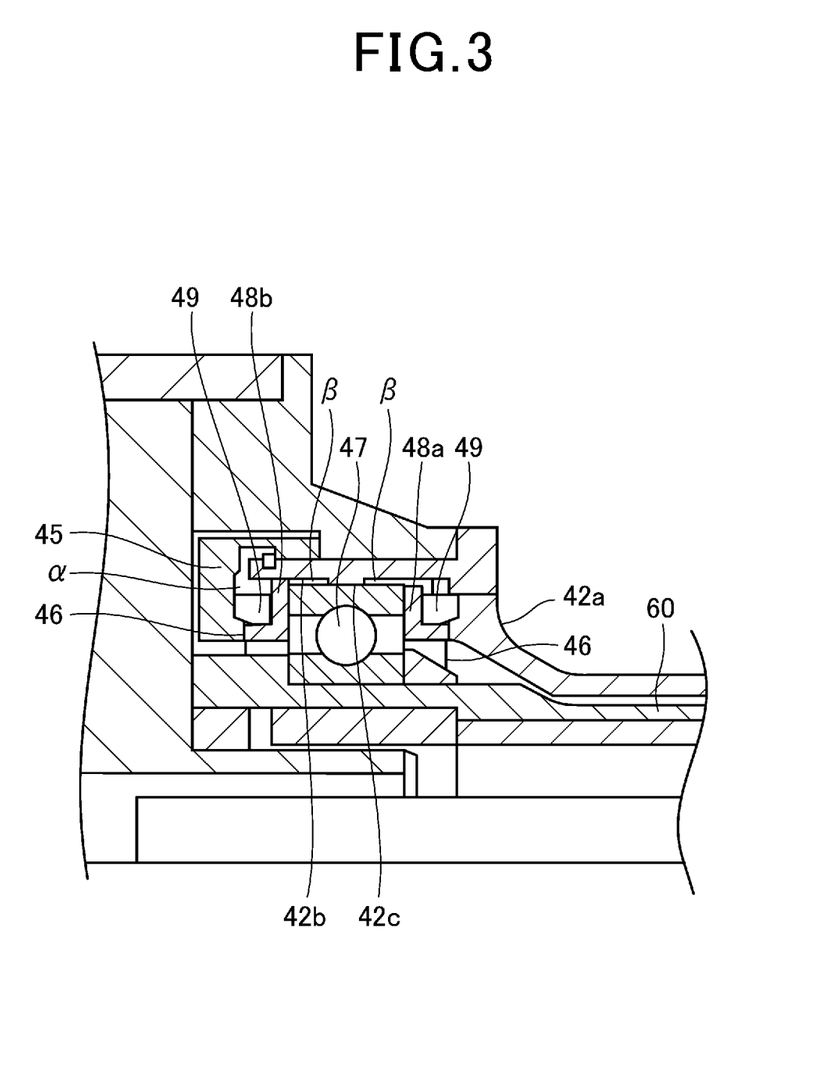
FIG. 3 is an enlarged view of a part where a nut assembly is pivotally supported.

FIG. 3 is an enlarged view of a part of FIG. 2 where the nut assembly 60 is pivotally supported. Inside of the first housing 42 has a plurality of bearings 47 arranged, and the bearings 47 pivotally support the nut assembly 60 in a rotatable manner. In this embodiment, two bearings 47 are arranged side by side in the axial direction. The bearings 47 and 47 support the proximal end side of the nut assembly 60. Although the bearings 47 and 47 are ball bearings in FIG. 3, the bearings may be, for example, roller bearings, slide bearings, and magnetic bearings.

The first housing 42 houses holders (first holder 48a and second holder 48b) that sandwich the bearings 47 and 47 from both sides in the axial direction. The first holder 48a is arranged on the wheel side, and the second holder 48b is arranged on the vehicle body side. The first holder 48a and the second holder 48b have an annular shape when viewed from the axial direction, and have an L-shaped cross section (one side) in the axial direction.

Here, the wall portion on the wheel side of the first housing 42, which is orthogonal to the axial direction, is referred to as the first wall portion 42a. The housing 41 further is provided with a second wall portion 45 that partially partitions between the first housing 42 and the second housing 43 (FIG. 2) and is orthogonal to the axial direction. In the axial direction, there is formed a predetermined gap (referred to as a space a) between the second wall portion 45 (of the housing) and the second holder 48b (of the bearing 47) over the entire circumference around the shaft. The gap has an elastic body 49 (rubber) arranged therein. Further, in the axial direction, there is formed a predetermined gap (referred to as a space a) between the first wall portion 42a (of the housing) and the first holder 48a (of the bearing 47) over the entire circumference around the shaft. The gap has an elastic body 49 arranged therein. Each of the elastic bodies 49 has an annular shape when viewed from the axial direction, and has a predetermined thickness (width) in the radial direction and the axial direction. Each of the elastic bodies 49 is made of an elastically deformable member such as rubber.

In the radial direction (orthogonal to the axial direction), there is formed a predetermined gap (referred to as a gap β) over the entire circumference between the outer peripheral surfaces of the bearings 47 and 47 and the inner peripheral surface 42b of the cylindrical first housing 42. The inner peripheral surface 42b of the first housing 42 is provided with a restricting portion 42c (mate fitting) projecting radially inward by a predetermined length over the entire circumference. The end part of the restricting portion 42c is in contact with a part of the outer peripheral surfaces of the bearings 47 and 47. The restricting portion 42c is provided at a position corresponding to the boundary part between the two bearings 47, and the restricting portion 42c has a length in the axial direction such that the restricting portion 42c is in contact with a part of each of the outer peripheral surfaces of the two bearings 47.

There is provided a plate-shaped metal member 46 at a position radially inside the position where the elastic body 49 is arranged and between the second wall portion 45 and the second holder 48b. In this embodiment, the metal member 46 is fixed to the second holder 48b, but it may be fixed to the second wall portion 45. In addition, there is provide a plate-shaped metal member 46 at a position radially inside the position where the elastic body 49 is arranged and between the first wall portion 42a and the first holder 48a. In this embodiment, the metal member 46 is fixed to the first holder 48a, but it may be fixed to the first wall portion 42a. Each of the metal members 46 has a predetermined thickness, and the plate surface is arranged so as to be orthogonal to the axial direction. The metal members 46 may be referred to as machine fastening parts or a metal contact parts. The part between the metal members 46 and the housing 41 (the second wall portion 45 or the first wall portion 42a) may have a slight gap formed.

Figure 4:
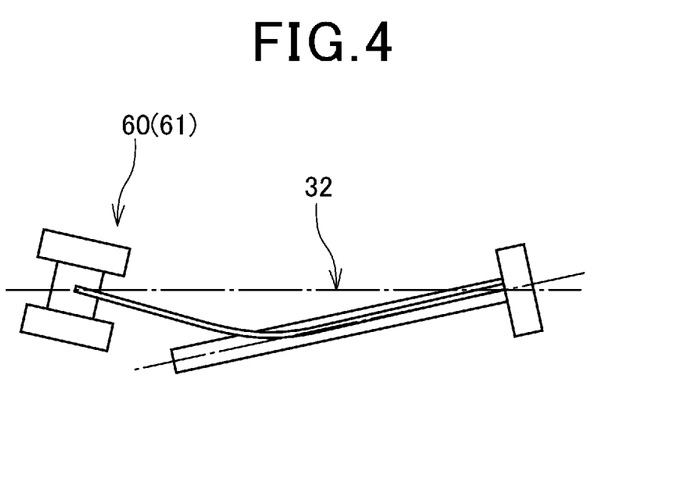
FIG. 4 is a diagram for describing an inclination of a ball screw.

FIG. 4 is a diagram for describing the inclination of the ball screw 32. As shown in FIG. 4, the axis of the ball screw 32 and the axis of the nut assembly 60 (ball screw nut 61) may deviate from each other due to the accuracy at the time of assembly or the like. In this case, if there is generated a force (prying force) such that the ball screw 32 twists the ball screw nut 61, the reaction force applied to the ball screw 32 may cause a problem.

The suspension device 10 according to this embodiment includes a damper 20 formed in a cylindrical shape. The damper 20 includes: a ball screw 32; a ball screw nut 61 screwed with the ball screw 32; bearings 47 that rotatably support a nut unit (nut assembly 60) provided with the ball screw nut 61; and a housing 41 that houses the bearings 47 inside. The part between the housing 41 and the bearings 47 in the axial direction is provided with elastic bodies 49. With this configuration, the bearings 47, which are the nut assembly support portions for supporting the nut assembly 60, are sandwiched by the elastic bodies 49 from both sides in the axial direction. This decreases the support rigidity (rigidity against prying) of the nut assembly support portion. Therefore, if the ball screw 32 inclines with respect to the axial direction, which applies a prying force to the ball screw nut 61, the elastic bodies 49 elastically deform and the nut assembly 60 accordingly inclines with respect to the axial direction. This decreases the load applied to the screwed part of the ball screw 32 and the ball screw nut 61.

Figure 5:
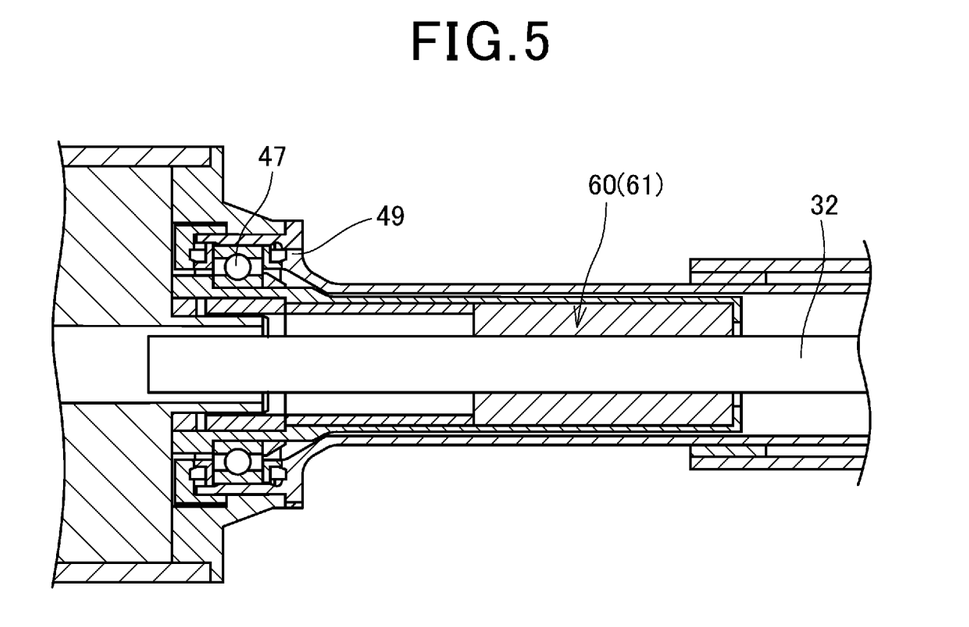
FIG. 5 is a diagram for describing a state in which the nut assembly inclines with respect to an axial direction.

FIG. 5 is a diagram for describing a state in which the nut assembly 60 inclines with respect to the axial direction, and the nut assembly 60 may inclines with the bearing 47 side being as a fulcrum. This may be referred to as words such as "the nut assembly 60 bends", or "the nut assembly 60 turns". As a result, if the axis of the ball screw nut 61 and the axis of the ball screw 32 are misaligned, the nut assembly 60 inclines to absorb the prying.

In addition, the rigidity of the support portion of the nut assembly 60 decreases, and the nut assembly 60 can slightly move in the axial direction (the moving direction of the ball screw 32). This can mitigate the impact force in any of the direction in which the spring 13 extends and the direction in which the spring 13 contracts.

Furthermore, providing the elastic bodies 49, which is a structure for mitigating the prying, absorbs and blocks high-frequency vibration, which allows decreasing the operating noise and improving the ride quality of the vehicle.

Figure 6A:
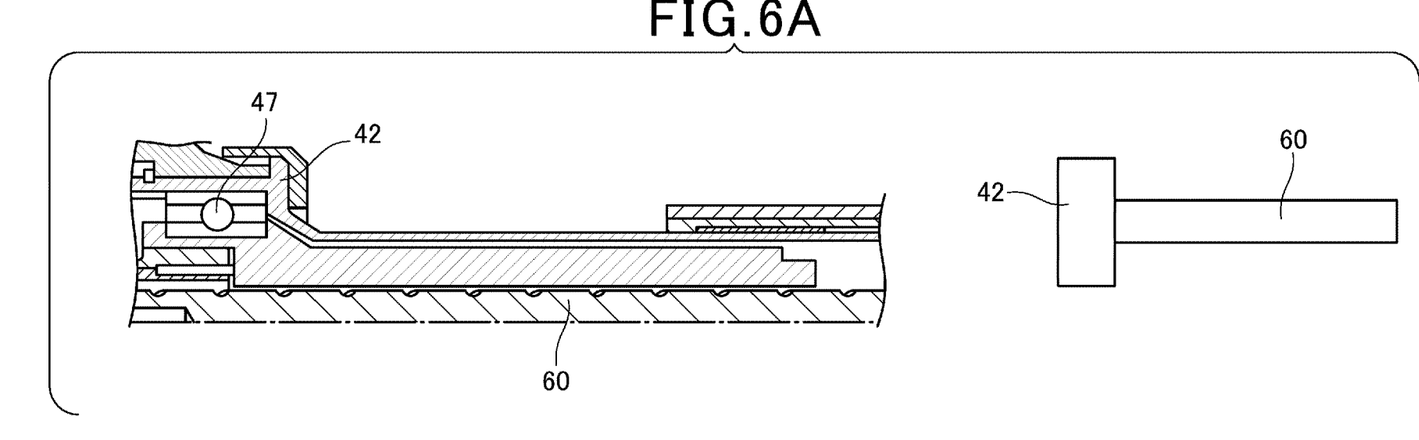
FIG. 6A is a diagram showing a state in which there is mounted no structure for mitigating ball screw prying.
Figure 6B:
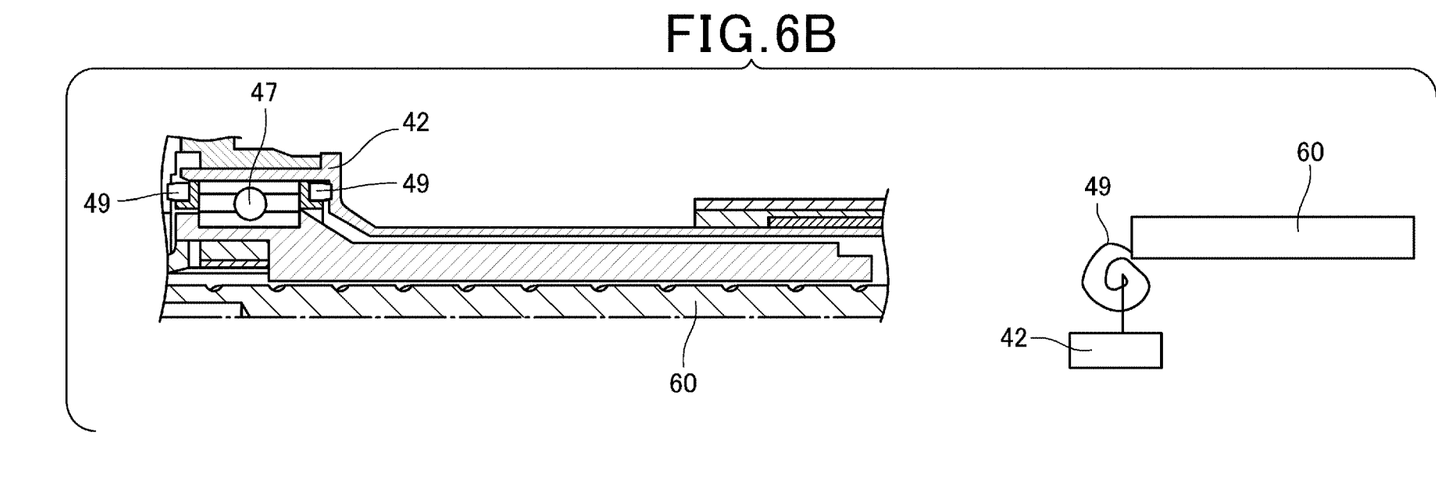
FIG. 6B is a diagram showing a state in which there is mounted a structure for mitigating ball screw prying.

Providing the elastic bodies 49 can decrease the rigidity of the support portion of the nut assembly 60. Here, FIG. 6A is a diagram showing a state in which there is mounted no structure for mitigating the ball screw prying is mounted, and FIG. 6B is a diagram showing a state in which there is mounted a structure for mitigating the ball screw prying. Providing the structure for mitigating the ball screw prying can decrease the rigidity of the support portion of the nut assembly 60, and can lower the natural frequency that causes the operating noise. This can decrease the operating noise.

Furthermore, according to this embodiment, the parts between the housing 41 and each of the bearings 47 in the radial direction (FIG. 3) have a gap β provided therein.

This can prevent the bearing 47 from coming into contact with the inner peripheral surface 42b of the housing 41 when the elastic bodies 49 deform and the nut assembly 60 inclines. In other words, it is possible to prevent the bearings 47 from coming into contact with the inner peripheral surface 42b and hindering the nut assembly 60 from inclining. This can cause the nut assembly 60 to smoothly incline to absorb the prying.

According to this embodiment, there is provided a restricting portion 42c, which is in contact with a part of the outer peripheral surface of the bearings 47, inside the housing 41 (FIG. 3).

With this configuration, the restricting portion 42c centers the bearings 47 when the suspension device 10 is assembled, so that the axis of the bearings 47 can be aligned with the axis of the housing 41 with high accuracy. In other words, the centering of the bearings 47 can be achieved. This can suppress axis deviation and improve the quality of the product.

Furthermore, according to this embodiment, there are provided plate-shaped metal members 46 at positions radially inside the positions where the elastic bodies 49 are arranged and between the housing 41 (first wall portion 42a or the second wall portion 45) and the bearings 47.

With this configuration, providing the plate-shaped metal members 46 between the elastic bodies 49 and the nut assembly 60, which is located radially inside the elastic bodies 49 and rotates around the shaft, can prevent the nut assembly 60 from biting the elastic bodies 49. This can prevent a malfunction generated due to the bite.

Here, the state in which the elastic bodies 49 are compressed and cannot further deform is defined as a maximum compression state. Then, when a force that compresses the elastic bodies 49 in the axial direction is applied, the metal members 46 and the housing 41 (first wall portion 42a or second wall portion 45) come into contact with each other before the elastic bodies 49 reach the maximum compression state. Therefore, when a large force is applied in the axial direction, the metal parts (metal members 46 and housing 41) come into contact with each other before the elastic bodies 49 are completely crushed. This can prevent the elastic bodies 49 from being deformed.

Figure 7:
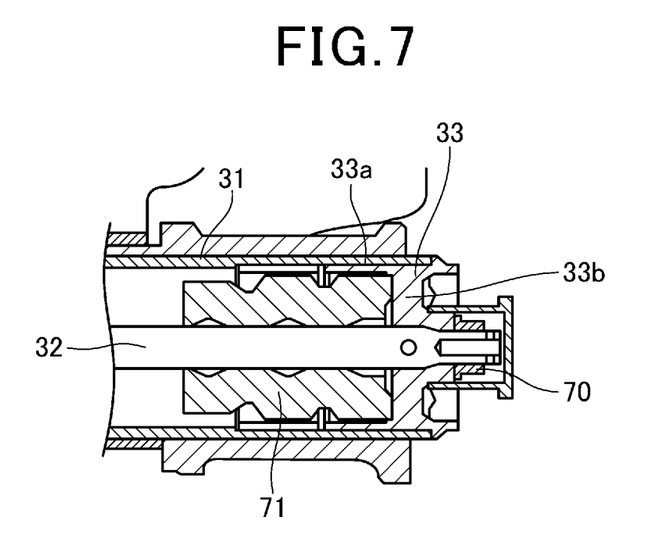
FIG. 7 is an enlarged view of a part where the ball screw is supported.

Next, the following describes the wheel side (tire side) part of the cylinder unit 30. FIG. 7 is an enlarged view of a part of FIG. 2 in which the ball screw 32 is supported. The wheel side end part of the outer cylinder 31 (cylinder portion) has a metal fastening member 33 (pulley) attached thereto. The fastening member 33 is a bottomed cylindrical metal member, and includes a side wall portion 33a and a bottom portion 33b. The fastening member 33 has a U-shaped cross section in the axial direction.

The side wall portion 33a is provided in an annular shape along the outer circumference of the circular bottom portion 33b, and is formed so as to extend in the axial direction. The outer diameter of the side wall portion 33a is smaller than the inner diameter of the outer cylinder 31, and the side wall portion 33a is inserted inside the outer cylinder 31.

The bottom portion 33b is provided with a through hole penetrating in the axial direction, and the ball screw 32 is inserted through this through hole. The fastening member 33 is attached to the wheel side end part of the outer cylinder 31 with the ball screw 32 inserted through the fastening member 33.

The wheel side end part of the ball screw 32 has a fixing member 70 fastened thereto. A nut is used as the fixing member 70. The ball screw 32, with its end part being tightened by the fixing member 70, is fixed to the fastening member 33. In other words, the fixing member 70 fixes the ball screw 32 to the fastening member 33. The tightened fixing member 70 is in contact with the fastening member 33.

The wheel side of the outer cylinder 31 has an elastic member 71 (bush) housed therein. The outer diameter of the elastic member 71 is smaller than the inner diameter of the outer cylinder 31, and smaller than the inner diameter of the side wall portion 33a of the fastening member 33. The elastic member 71 has a hole penetrating in the axial direction, and is a hollow member through which the ball screw 32 is inserted. The elastic member 71 is formed of rubber or the like so as to be elastically deformable. When the outer cylinder 31 moves to the vehicle body side in the axial direction and the elastic member 71 comes into contact with the end part of the inner cylinder 44 (FIG. 2), the elastic member 71 elastically deforms. The elastic deformation of the elastic member 71 absorbs the impact.

The elastic member 71 is housed inside the side wall portion 33a of the fastening member 33. In other words, the side wall portion 33a supports the elastic member 71 through which the ball screw 32 is inserted.

Figure 8:
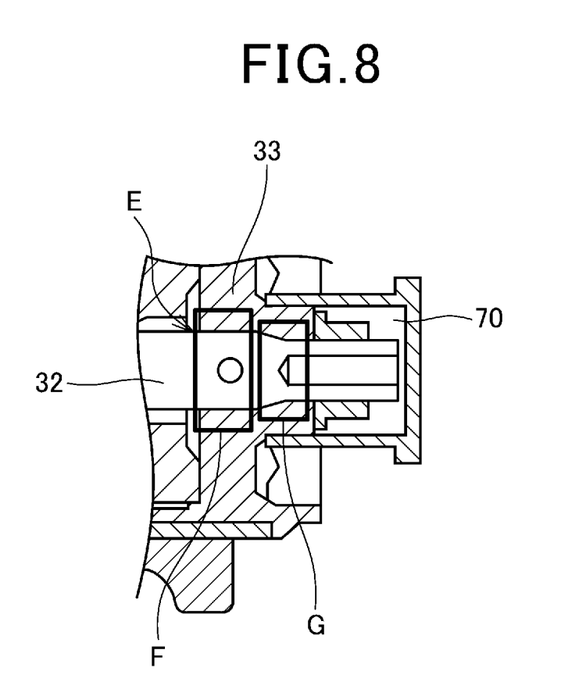
FIG. 8 is an enlarged view of a part where the ball screw is inserted through a fastening member.

FIG. 8 is an enlarged view of a part where the ball screw 32 in FIG. 7 is inserted through the fastening member 33. Here, the part where the ball screw 32 is inserted through the fastening member 33 is referred to as the insertion portion E. The insertion portion E may be said to be a part where the ball screw 32 penetrates the fastening member 33.

The insertion portion E is provided with a fitting portion F where the ball screw 32 fits the fastening member 33. In this embodiment, the fitting portion F has a spline fitting structure. Although not shown, in the fitting portion F, the outer peripheral surface of the ball screw 32 has teeth (male splines), extending for a predetermined length in the axial direction, formed at predetermined intervals in the circumferential direction. The teeth project radially outward. Although not shown, in the fitting portion F, the inner peripheral surface of the fastening member 33 has grooves (female splines), extending for a predetermined length in the axial direction, formed at predetermined intervals in the circumferential direction. The shapes of the male spline and the female spline are, for example, a trapezoidal cross section or a triangular cross section, and the male spline and the female spline mesh with each other. In other words, in the fitting portion F, the teeth of the ball screw 32 and the groove of the fastening member 33 are in mesh with each other. As a result, the rotation of the ball screw 32 is restricted by the fastening member 33.

The insertion portion E is provided with a contact portion G where the outer peripheral surface of the ball screw 32 and the inner peripheral surface of the fastening member 33 are in surface contact with each other. The contact portion G is provided on the wheel side of the fitting portion F. In the contact portion G, the outer peripheral surface of the ball screw 32 is inclined so as to be radially inward toward the wheel side in the axial direction. Also, in the contact portion G, the inner peripheral surface of the fastening member 33 is inclined so as to be radially inward toward the wheel side in the axial direction. In other words, in the contact portion G, both the outer peripheral surface (seat surface) of the ball screw 32 and the inner peripheral surface (seat surface) of the fastening member 33 are tapered. In the contact portion G, the outer peripheral surface of the ball screw 32 and the inner peripheral surface of the fastening member 33 are in surface contact with each other, and the contact surface is inclined with respect to the axial direction. Specifically, the contact surface is inclined so as to be radially inward from the vehicle body side toward the wheel side (the side provided with the fixing member 70) in the axial direction.

As described above, the suspension device 10 according to this embodiment includes a damper 20 formed in a cylindrical shape. The damper 20 includes: a cylinder portion (outer cylinder 31); a ball screw 32 housed in the cylinder portion (outer cylinder 31); a fastening member 33 that supports the ball screw 32 inserted therethrough and is attached to the end part of the cylinder portion (outer cylinder 31); and a fixing member 70 that is attached to the end part of the ball screw 32 and fixes the ball screw 32 to the fastening member 33. The insertion portion E, where the ball screw 32 is inserted through the fastening member 33, is provided with a fitting portion F where the ball screw 32 fits the fastening member 33, and the fitting portion F has a spline fitting structure.

With this configuration, providing the fitting portion F and forming the fitting portion F into a spline fitting structure can prevent the torque due to the rotation of the ball screw 32 from being transmitted to the fastening member 33 and then from being transmitted to the fixing member 70. This can suppress the torque due to the rotation of the ball screw 32 being transmitted to the fixing member 70 to loosen the fixing of the fixing member 70 to deviate the axis of the ball screw 32. This can suppress a load due to the axis deviation of the ball screw 32 being applied to the parts to deteriorate them. In other words, it is possible to provide a suspension device that suppresses deterioration of parts due to deviation of the axis of the ball screw 32.

Figure 9A:
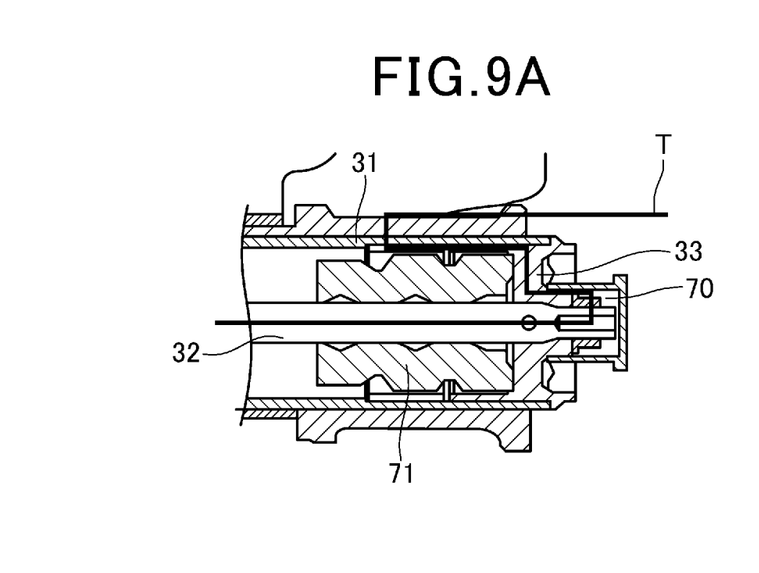
FIG. 9A is a diagram showing a case in which a spline fitting structure is not provided.

FIG. 9A shows a case in which the fitting portion F having a spline fitting structure is not provided, and FIG. 9B shows a case in which the fitting portion F having a spline fitting structure is provided. The thick line in the figure indicates the torque transmission path T. When the fitting portion F is not provided as shown in FIG. 9A, torque due to the rotation of the ball screw 32 is applied to the fixing member 70. In other words, the torque due to the rotation of the ball screw 32 passes through the fixing member 70. Therefore, there arises a problem in which the fixing member 70 loosens and the axis of the ball screw 32 deviates.

Figure 9B:
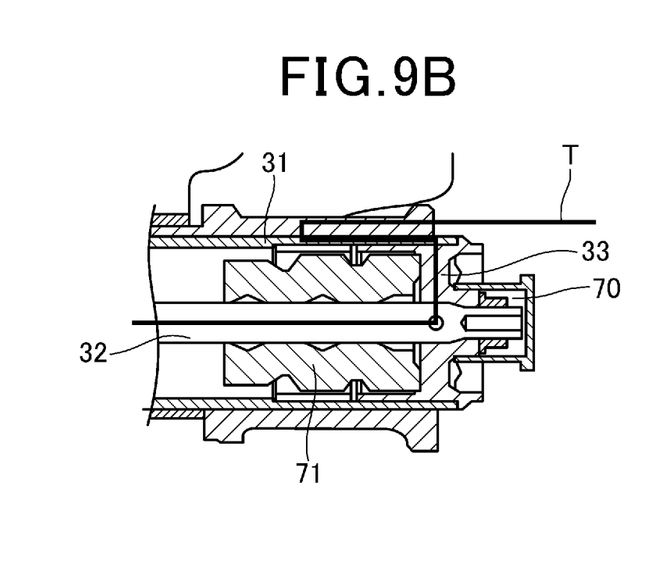
FIG. 9B is a diagram showing a case in which a spline fitting structure is provided.

On the other hand, as shown in FIG. 9B, when the fitting portion F is provided, the torque due to the rotation of the ball screw 32 is directly transmitted to the fastening member 33, which is the fitting mate of the ball screw 32, and the torque does not pass through the fixing member 70. This can suppress the fixing of the fixing member 70 loosening to deviate the axis of the ball screw 32.

Furthermore, according to this embodiment, the insertion portion E is provided with a contact portion G in which the outer peripheral surface of the ball screw 32 and the inner peripheral surface of the fastening member 33 are in surface contact with each other, and the contact surface of the contact portion G is inclined so as to be radially inward toward the side provided with the fixing member 70, in the axial direction.

With this configuration, when the ball screw 32 is inserted in the fastening member 33 during assembly, the ball screw 32 is guided, so that the axis of the ball screw 32 can be aligned with the axis of the fastening member 33 with high accuracy. In other words, this can achieve the centering of the ball screw 32. This can stabilize the workability in assembly when the ball screw 32 and the fastening member 33 are spline-fitted, and the productivity can improve. Additionally, the contact portion G also functions as a receiving surface that receives the force when a force is applied in the axial direction, and the contact portion G can receive the force to decrease the load applied to the other parts.

Furthermore, according to this embodiment, the fastening member 33 includes an annular side wall portion 33a that extends in the axial direction and is inserted inside the cylinder portion (outer cylinder 31), and the side wall portion 33a supports the elastic member 71 through which the ball screw 32 is inserted.

As a result, if the ball screw 32 generates a force for prying the elastic member 71, the prying is suppressed because the side wall portion 33a is provided. In other words, this suppresses the ball screw 32 inclining. This can suppress the ball screw 32 inclining to transmit the torque due to the rotation of the ball screw 32 in an unintended direction. For example, this can suppress the torque being transmitted to the fixing member 70 to loosen the fixing of the fixing member 70. Therefore, this can suppress the fixing member 70 loosening to deviate the axis of the ball screw 32 so that the load is applied to the parts to deteriorate the parts.

Although the present invention has been described above based on the embodiments, the present invention is not limited to these embodiments. Since the embodiment merely illustrates the aspects of implementation according to the present invention shown below, they can be modified and applied in any manner without departing from the spirit of the present invention.

The present invention is as follows.

Configuration 1: A suspension device including a damper, the damper including a cylinder portion, a ball screw housed in the cylinder portion, a fastening member that supports the ball screw with the ball screw being inserted through the fastening member and is attached to an end part of the cylinder portion, and a fixing member that is attached to an end part of the ball screw and fixes the ball screw to the fastening member, wherein an insertion portion, where the ball screw is inserted into the fastening member, is provided with a fitting portion where the ball screw fits the fastening member, the fitting portion having a spline fitting structure.

This configuration can suppress the torque due to the rotation of the ball screw being transmitted to the fixing member to loosen the fixing of the fixing member to deviate the axis of the ball screw. Therefore, this can suppress the load due to the axis deviation of the ball screw being applied to the parts to deteriorate the parts. In other words, it is possible to provide a suspension device that can suppress deterioration of parts based on the axis deviation of the ball screw.

Configuration 2: The suspension device according to configuration 1, wherein the insertion portion is provided with a contact portion on which an outer peripheral surface of the ball screw and an inner peripheral surface of the fastening member are in surface contact with each other, and a contact surface of the contact portion is inclined so as to be radially inward toward a side provided with the fixing member, in an axial direction.

This configuration can align the axis of the ball screw with the axis of the fastening member with high accuracy. This can stabilize the workability in assembly when the ball screw and the fastening member are spline-fitted, and the productivity can improve.

Configuration 3: The suspension device according to configuration 1 or 2, wherein the fastening member includes an annular side wall portion that extends in an axial direction and is inserted inside the cylinder portion, and the side wall portion supports an elastic member into which the ball screw is inserted.

This configuration can suppress the ball screw inclining by the side wall portion, and can suppress the ball screw inclining to transmit the torque due to the rotation of the ball screw in an unintended direction. For example, this can suppress the torque being transmitted to the fixing member to loosen the fixing of the fixing member. Therefore, this can suppress the fixing of the fixing member loosening to deviate the axis of the ball screw, and a load being applied to the parts to deteriorate the parts.

REFERENCE SIGNS LIST

1 wheel
2 vehicle body
10 suspension device
11 one end portion
12 other end portion
13 spring
14 first spring support portion
15 second spring support portion
20 damper
30 cylinder unit
31 outer cylinder (cylinder portion)
32 ball screw
33 fastening member
33a side wall portion
33b bottom portion
40 housing unit
41 housing
42 first housing
42a first wall portion
43 second housing
44 inner cylinder
45 second wall portion
46 metal member
47 bearing
48a first holder
48b second holder
49 elastic body
50 motor
60 nut assembly (nut unit)
61 ball screw nut
62 nut support portion
70 fixing member
71 elastic member
α space
β gap
E insertion portion
F fitting portion
G contact portion

What is claimed is:

1. A suspension device comprising a damper,
the damper including a cylinder portion, a ball screw housed in the cylinder portion, a fastening member that supports the ball screw with the ball screw being inserted through the fastening member and an elastic member, and is attached to an end part of the cylinder portion, and a fixing member that is attached to an end part of the ball screw and fixes the ball screw to the fastening member, the fixing member being disposed at a side of the fastening member opposite the elastic member, wherein an insertion portion, where the ball screw is inserted into the fastening member, is provided with a fitting portion where the ball screw fits the fastening member, the fitting portion having a spline fitting structure.

2. The suspension device according to claim 1, wherein
the insertion portion is provided with a contact portion on which an outer peripheral surface of the ball screw and an inner peripheral surface of the fastening member are in surface contact with each other, and a contact surface of the contact portion is inclined so as to be radially inward toward a side provided with the fixing member, in an axial direction.

3. The suspension device according to claim 1, wherein
the fastening member includes an annular side wall portion that extends in an axial direction and is inserted inside the cylinder portion, wherein the side wall portion contacts an inner surface of the cylinder portion that extends in the axial direction, and supports the elastic member and the ball screw in the cylinder portion.

4. The suspension device according to claim 1, wherein
the damper includes a cylinder unit comprising the cylinder portion, the ball screw, and the fastening member, and a housing unit which realizes extension and contraction of the damper by moving relatively to the cylinder unit, the housing unit includes an inner cylinder housed inside the cylinder portion, and the elastic member elastically deforms between an end portion of the inner cylinder and the fastening member when the cylinder portion moves axially and the elastic member comes into contact with the end portion of the inner cylinder.

* * * * *